(12) United States Patent
Song

(10) Patent No.: US 12,057,543 B2
(45) Date of Patent: Aug. 6, 2024

(54) BATTERY CELL MANUFACTURING DEVICE

(71) Applicant: LG Energy Solution, Ltd., Seoul (KR)

(72) Inventor: Young Min Song, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 122 days.

(21) Appl. No.: 17/592,604

(22) Filed: Feb. 4, 2022

(65) Prior Publication Data

US 2022/0255110 A1 Aug. 11, 2022

(30) Foreign Application Priority Data

Feb. 9, 2021 (KR) .................. 10-2021-0018467

(51) Int. Cl.
| | |
|---|---|
| *H01M 10/04* | (2006.01) |
| *B29C 65/00* | (2006.01) |
| *B29C 65/18* | (2006.01) |
| *B29L 31/00* | (2006.01) |

(52) U.S. Cl.
CPC ......... *H01M 10/0404* (2013.01); *B29C 65/18* (2013.01); *B29C 66/433* (2013.01); *B29C 66/83221* (2013.01); *B29C 66/9221* (2013.01); *B29C 66/929* (2013.01); *B29L 2031/7146* (2013.01)

(58) Field of Classification Search
CPC ......... H01M 10/0404; H01M 10/0409; H01M 10/0413
See application file for complete search history.

(56) References Cited

U.S. PATENT DOCUMENTS

2018/0047950 A1* 2/2018 Lim .................. H01M 50/183
2018/0261807 A1   9/2018 Lim
2020/0343518 A1* 10/2020 Yamamoto ........ H01M 10/0525

FOREIGN PATENT DOCUMENTS

| CN | 104953185 B | 2/2018 | |
|---|---|---|---|
| KR | 101417152 B1 | 8/2014 | |
| KR | 101648428 B1 | 9/2016 | |
| KR | 101852250 B1 | 4/2018 | |
| KR | 101947149 B1 | 2/2019 | |
| KR | 2076786 B1 * | 2/2020 | ........... B29C 66/433 |
| KR | 102076786 B1 | 2/2020 | |
| KR | 102079737 B1 | 2/2020 | |

* cited by examiner

*Primary Examiner* — Matthew T Martin
*Assistant Examiner* — Bartholomew A Hornsby
(74) *Attorney, Agent, or Firm* — Lerner David LLP

(57) ABSTRACT

A battery cell manufacturing device according to one embodiment of the present disclosure includes a sealing tool that presses a sealing part, in a battery case including a sealing part having a structure in which an electrode assembly is mounted onto a receiving part, and an outer peripheral surface is sealed by heat fusion, wherein the sealing tool comprises a first sealing tool located at an upper part and a second sealing tool located at a lower part with respect to the battery case, and wherein the sealing tool comprises a sealing surface in contact with the sealing part, and at least one pressure sensor is located on the sealing surface.

6 Claims, 12 Drawing Sheets

BATTERY CELL MANUFACTURING DEVICE

CROSS-REFERENCE TO RELATED APPLICATIONS

This application claims priority to Korean Patent Application No. 10-2021-0018467, filed on Feb. 9, 2021, the entire contents of which are hereby incorporated by reference herein.

TECHNICAL FIELD

The present disclosure relates to a battery cell manufacturing device which reduces the pressure deviation applied to the sealing part formed on the battery case of the battery cell.

BACKGROUND

Along with the increase of technology development and demands for mobile devices, the demand for batteries as energy sources is rapidly increasing. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Based on the shape of a battery case, such a secondary battery is classified into a cylindrical battery where an electrode assembly is mounted in a cylindrical metal can, a prismatic battery where an electrode assembly is mounted in a prismatic metal can, and a pouch type battery where an electrode assembly is mounted in a pouch type case formed of an aluminum laminate sheet. Here, the electrode assembly mounted in the battery case is a power generating element, having a structure including a cathode, an anode, and a separator interposed between the cathode and the anode, and capable of being charged and discharged. The electrode assembly may be classified as a jelly-roll type electrode assembly configured to have a structure in which a long sheet-type cathode and a long sheet-type anode, which are coated with active materials, are wound in a state where a separator is interposed between the cathode and the anode, and a stacked type electrode assembly configured to have a structure in which a plurality of cathodes and anodes are sequentially stacked in a state in which separators are interposed between the cathodes and the anodes.

Among them, particularly, a pouch type battery, having a structure in which a stacked/folded type electrode assembly is mounted in a pouch type battery case formed of an aluminum laminate sheet, has advantages such as low manufacturing costs, small weight, and easy shape deformation, and therefore, its usage is gradually increasing.

Here, in the case of a pouch type battery, pressure and heat are applied to an outer peripheral surface of the pouch type case by a sealing tool to seal the case. However, if the position between the pouch type battery and the sealing tool is deviated, there is a problem that the pressure applied differs depending on the position of the outer peripheral surface of the pouch type case and thus the sealing quality is deteriorated in some outer peripheral surfaces. Accordingly, even if the position between the pouch type battery and the sealing tool is deviated, there is a need to develop a battery cell manufacturing device that reduces the deviation in pressure applied along the outer peripheral surface of the pouch type case and thus improves the sealing quality.

DETAILED DESCRIPTION OF THE INVENTION

Technical Problem

It is an object of the present disclosure to provide a battery cell manufacturing device which reduces the pressure deviation applied to the sealing part formed on the battery case of the battery cell.

The objects of the present disclosure are not limited to the aforementioned objects, and other objects which are not described herein should be clearly understood by those skilled in the art from the following detailed description and the accompanying drawings.

Technical Solution

In order to achieve the above object, according to one embodiment of the present disclosure, there is provided a battery cell manufacturing device comprising: a sealing tool configured to press a sealing part of a battery case, the battery case including an electrode assembly mounted within a receiving part thereof, the sealing part being an outer peripheral surface of the battery case that is configured to be sealed by heat fusion, wherein the sealing tool comprises a first sealing tool and a second sealing tool, the sealing tool being configured to receive the battery case therein with the first sealing tool located above an upper part of the battery case and the second sealing tool located below a lower part of the battery case, and wherein the sealing tool comprises a sealing surface configured to contact the sealing part of the battery case, and the sealing tool has at least one pressure sensor located on the sealing surface.

The sealing surface comprises a first sealing surface and a pair of second sealing surfaces, and the first sealing surface may be located between the pair of second sealing surfaces.

The at least one pressure sensor may include a first pressure sensor and a pair of second pressure sensors, the first pressure sensor may be located on the first sealing surface, and the pair of second pressure sensors may be located respectively on the pair of second sealing surfaces.

The sealing part may be configured to press a portion of the sealing part of the battery case through which an electrode lead part protrudes through the sealing part to an outside of the battery case, and the electrode lead part may comprise an electrode lead and a lead film attached to at least one surface of the electrode lead.

The first sealing surface may be configured to face a center of the electrode lead, and the pair of second sealing surfaces may be configured to have positions adjacent to respective opposite ends of the electrode lead.

The sealing tool may have a pair of steps on the sealing surface extending between the first sealing surface and the pair of second sealing surfaces, respectively.

At least one of the first sealing tool and the second sealing tool may have the pair of steps.

The at least one pressure sensor may be configured to measure a difference between a pressure value included in a first pressure information measured by a first pressure sensor and a pressure value included in a second pressure information measured by a second pressure sensor, and the difference may be 0 MPa or more and 0.4 MPa or less.

The at least one pressure sensor may be configured to detect when a pressure value included in a first pressure information measured by the first pressure sensor and a pressure value included in a second pressure information measured by the second pressure sensor may be equal to each other.

The first sealing surface and the pair of second sealing surfaces may each have a flat structure.

At least one of the first sealing tool and the second sealing tool may be configured to be inclined with respect to a plane defining at least one surface of the sealing part of the battery case.

The at least one pressure sensor may be configured to measure a difference between a pressure value included in the first pressure information measured by the first pressure sensor and a pressure value included in a second pressure information measured by the second pressure sensor, and the difference may be 0 MPa or more and 0.4 MPa or less.

The at least one pressure sensor may be configured to detect when a pressure value included in a first pressure information measured by the first pressure sensor and a pressure value included in a second pressure information measured by the second pressure sensor may be equal to each other.

Advantageous Effects

According to embodiments of the present disclosure, at least one pressure sensor can be disposed on the sealing surface of the sealing tool, thereby reducing the pressure deviation applied to the sealing part formed in the battery case of the battery cell.

The effects of the present disclosure are not limited to the effects mentioned above and additional other effects not described above will be clearly understood from the description of the appended claims by those skilled in the art.

DETAILED DESCRIPTION OF THE EMBODIMENTS

Figure 1:
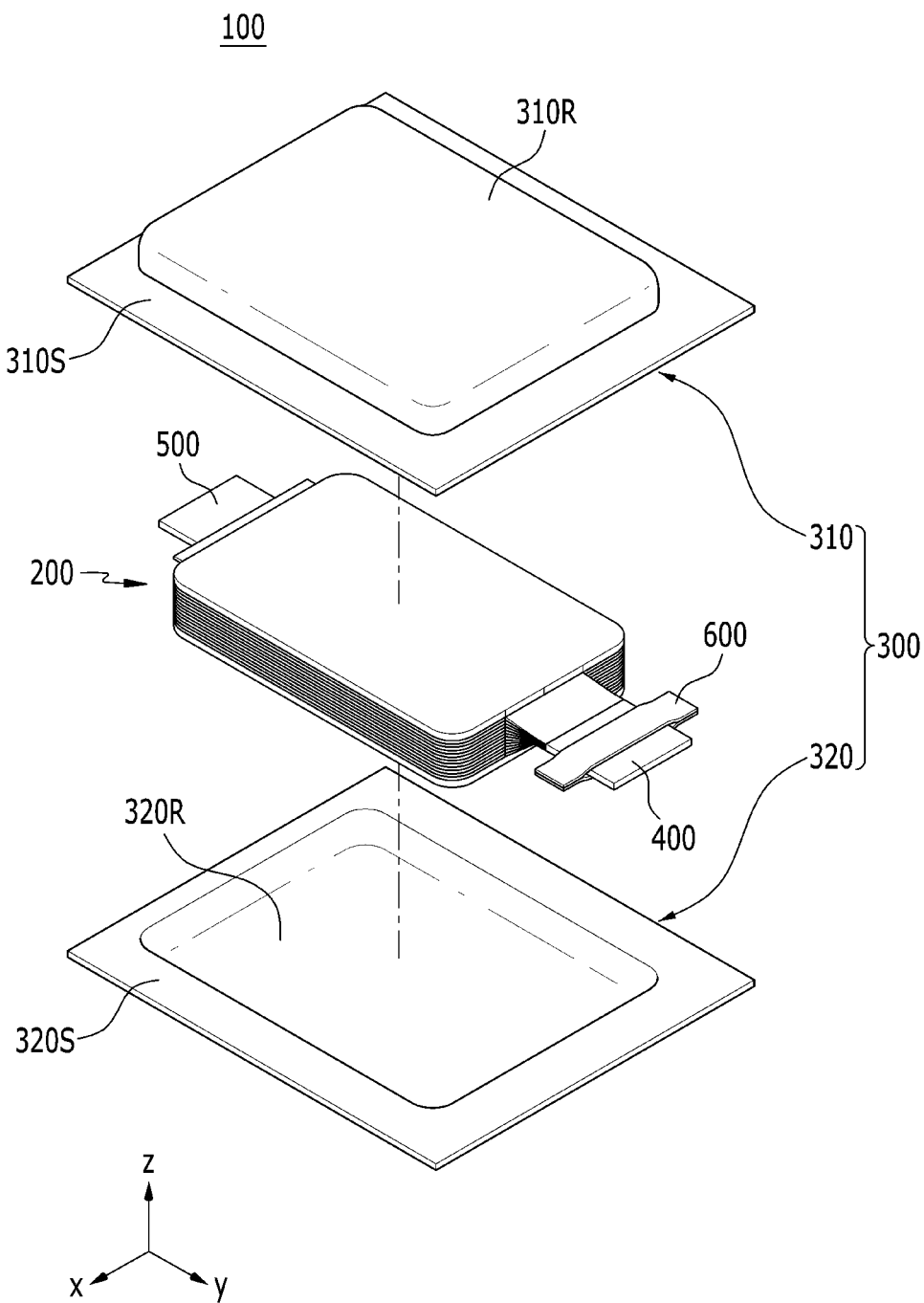
FIG. 1 is an exploded perspective view of a battery cell according to an embodiment of the present disclosure.

Hereinafter, various embodiments of the present disclosure will be described in detail with respect to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the drawings, the size and thickness of each element are arbitrarily illustrated for convenience of the description, and the present disclosure is not necessarily limited to those illustrated in the drawings. In the drawings, the thickness of layers, regions, etc. are exaggerated for clarity. In the drawings, for convenience of the description, the thicknesses of some layers and regions are shown to be exaggerated.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Figure 2:
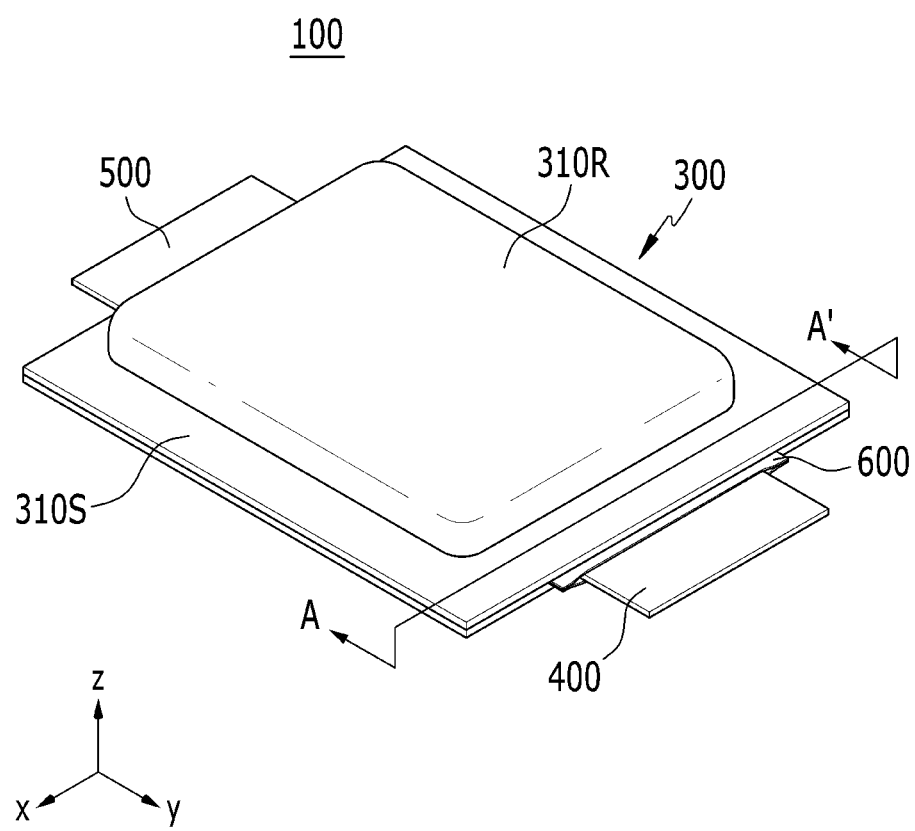
FIG. 2 is a perspective view showing a state in which the components of the battery cell of FIG. 1 are coupled.

FIG. 1 is an exploded perspective view of a battery cell according to an embodiment of the present disclosure. FIG. 2 is a perspective view showing a state in which the components of the battery cell of FIG. 1 are coupled.

Now, the pouch battery cell 100 according to an embodiment of the present disclosure is described. However, the description is made based on side surface of both side surfaces of the pouch battery cell 100, without being not necessarily limited thereto, and the other side surface will be described with identical or similar contents.

Referring to FIGS. 1 and 2, the battery cell 100 according to an embodiment of the present disclosure includes an electrode assembly 200; a pouch type battery case 300 in which the electrode assembly 200 is housed; electrode leads 400 and 500 that are electrically connected to the electrode assembly 200 and protrude to the outside of the battery case; and a lead film 600 located on at least one surface of the electrode leads 400 and 500.

The electrode assembly 200 may be configured in a jelly-roll (wound) type structure, a stacked (laminated) type structure or a combination (stacked/folded) type structure. More specifically, the electrode assembly 200 may include a cathode, an anode, and a separator disposed therebetween.

The battery case 300 may include an upper case 310 and a lower case 320, and outer peripheral surfaces of the upper case 310 and the lower case 320 may be heat-fused to each other. Although not specifically illustrated, the battery case 300 including the upper case 310 and the lower case 320 may be a laminate sheet including a resin layer and a metal layer. Specifically, each of the upper case 310 and the lower case 320 may include an inner resin layer for sealing, a metal layer for preventing penetration of a material, and an outermost outer resin layer.

The outer resin layer can have excellent tensile strength and weather resistance compared to its thickness and have electrical insulation property in order to protect the pouch type secondary battery 100 from the outside. The outer resin layer may include a polyethylene terephthalate (PET) resin or a nylon resin. The metal layer can prevent air, moisture and the like from flowing into the battery cell 100. The metal layer may include aluminum (Al). The inner resin layers may be heat-fused to each other by heat and pressure applied from a battery cell manufacturing device in a state where the electrode assembly 200 is built-in. The inner resin layer may include casted polypropylene (CPP) or polypropylene (PP).

Concave receiving parts 310R and 320R on which the electrode assembly 200 can be seated may be formed in each of the upper case 310 and the lower case 320, and the electrode assembly 200 may be housed in the receiving parts 310R and 320R. The method of forming the receiving parts 310R and 320R is not particularly limited, and a deep drawing process using a pressing punch can be applied.

Sealing parts 310S and 320S can be provided along the outer peripheral surfaces of the receiving parts 310R and 320R of the upper case 310 and the lower case 320, respectively. Here, the upper sealing part 310S of the upper case 310 and the lower sealing part 320S of the lower case 320 can be heat-fused to each other by the battery cell manufacturing apparatus 1100, 1200, 2100 and 2200 described later, thereby sealing the battery case 300. More specifically, the inner resin layer of the upper sealing part 310S and the inner resin layer of the lower sealing part 320S can be heat-fused in a state of facing each other.

On the other hand, although the receiving part is formed in FIG. 1, it may have a plate-like structure in which a receiving part is formed in only one of the upper case 310 and the lower case 320 and the receiving part is not formed in the other one. In addition, although the upper case 310 and the lower case 320 separated from each other is shown in FIG. 1, it may be a laminate sheet in which one side of the upper case and one side of the lower case are integrally formed.

Figure 3:
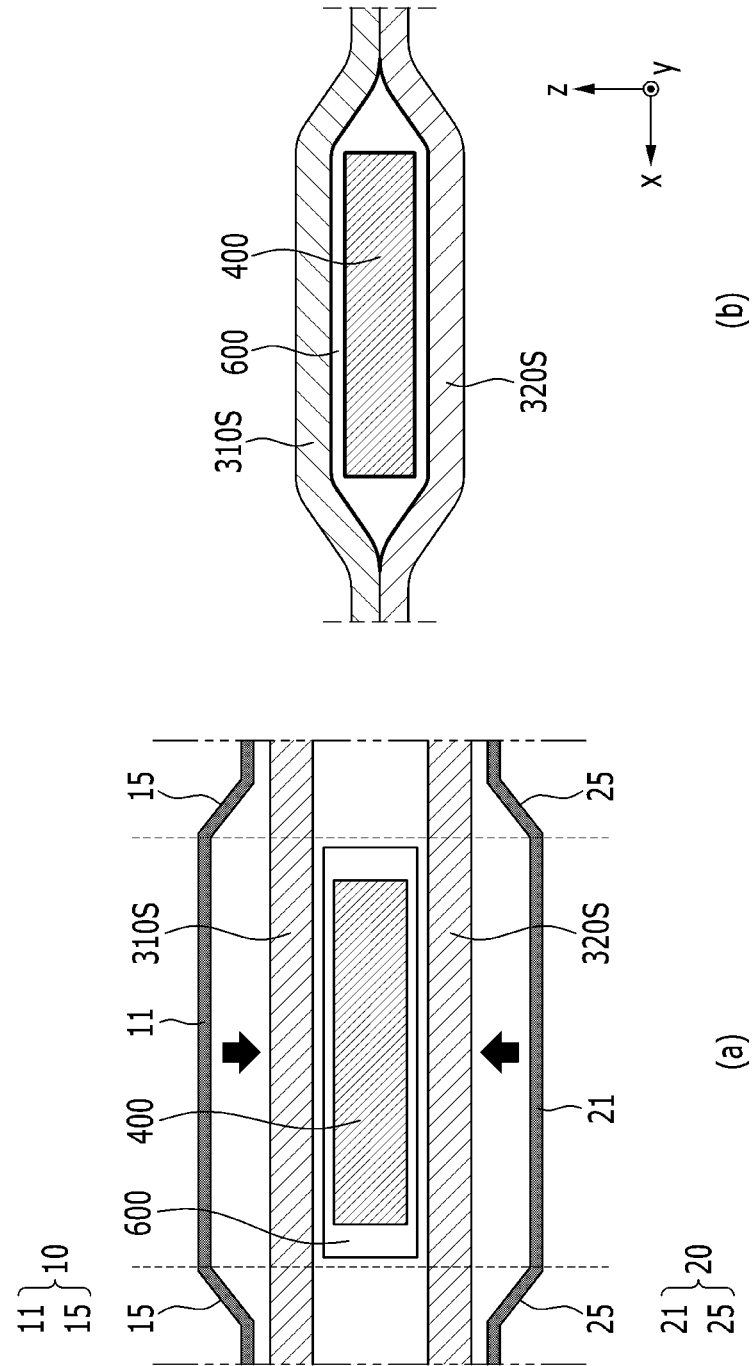
FIGS. 3 and 4 are cross-sectional views of the sealing part of the battery cell of FIG. 1 formed by a conventional battery cell manufacturing device, taken along the A-A' axis of FIG. 1.
Figure 4:
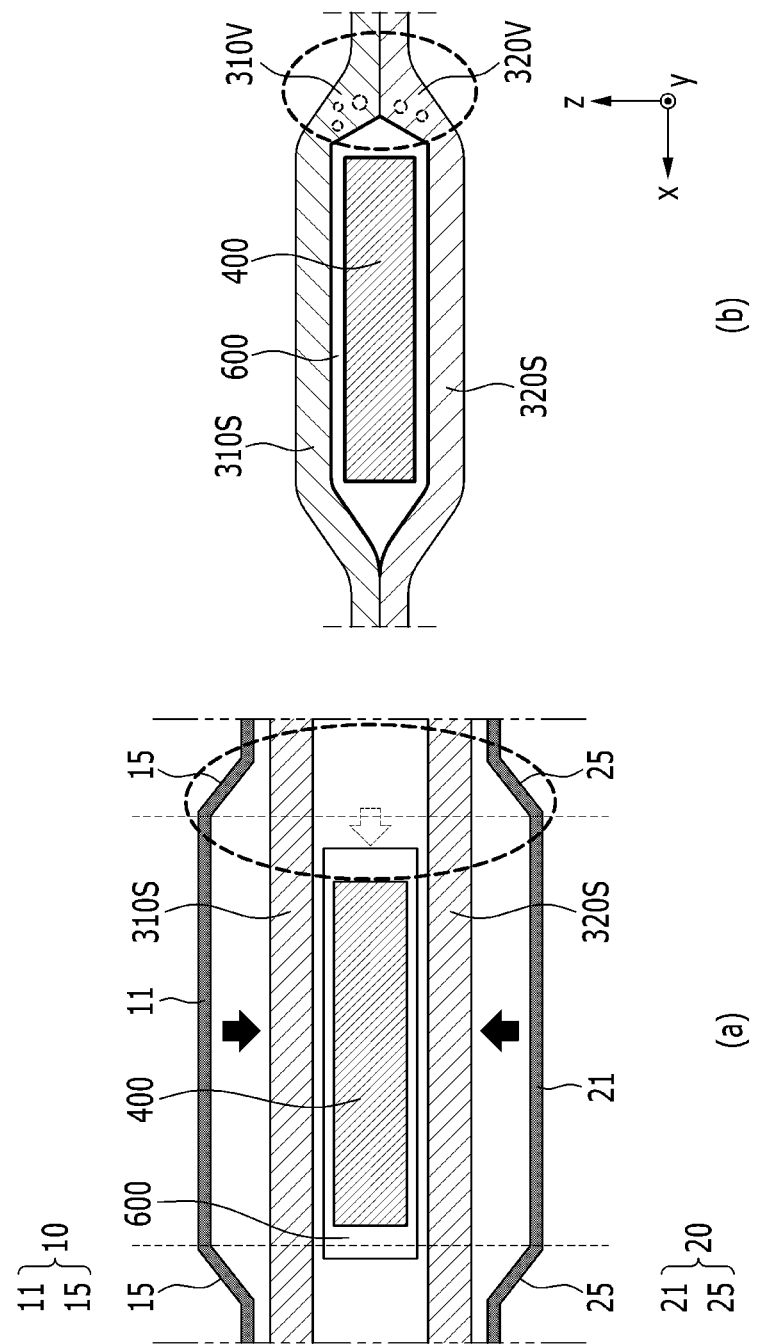

FIGS. 3 and 4 are cross-sectional views of the sealing part of the battery cell of FIGS. 1 and 2 formed by a conventional battery cell manufacturing device, taken along the A-A' axis of FIG. 2.

Hereinafter, the conventional battery cell manufacturing devices 10 and 20 will be described based on the end part of the pouch battery cell 100. However, the description will be made based on the sealing part in which the electrode lead 400 and the lead film 600 are located among the sealing parts of the pouch battery cell 100, without being necessarily limited thereto, and even in the case of the sealing part in which the opposite electrode lead 500 and the lead film 600 are positioned, the description will be made with same or similar contents.

Referring to FIGS. 3a and 4a, the conventional battery cell manufacturing device includes an upper sealing tool 10 and a lower sealing tool 20. Here, the upper sealing tool 10 is located at the upper part with respect to the sealing parts 310S and 320S of the pouch battery cell 100, and the lower sealing tool 20 is located at a lower part with respect to the sealing parts 310S and 320S of the pouch battery cell 100. In addition, the upper sealing tool 10 includes a first upper sealing surface 11 and a second upper sealing surface 15, but the second sealing surface 15 is formed with a step considering the thickness of the electrode lead 400 and the lead film 600 with respect to the first sealing surface 11. This can be similarly described with respect to the first lower sealing surface 21 and the second lower sealing surface 25 of the lower sealing tool 20.

Referring to FIG. 3(a), between the upper sealing tool 10 and the lower sealing tool 20, the positions of the electrode lead 400 and the lead film 600 located between the upper sealing part 310S and the lower sealing part 320S may conform to a designed position. At this time, referring to FIG. 3(b), the upper sealing part 310S and the lower sealing part 320S can be heat-fused to each other and sealed by the upper sealing tool 10 and the lower sealing tool 20.

However, unlike FIG. 3(a), between the upper sealing tool 10 and the lower sealing tool 20, the positions of the electrode lead 400 and the lead film 600 located between the upper sealing part 310S and the lower sealing part 320S may deviate from a designed position.

In one example, referring to FIG. 4(a), between the upper sealing tool 10 and the lower sealing tool 20, the positions of the electrode lead 400 and the lead film 600 may deviate toward the left side from the designed position. At this time, the right ends of the electrode lead 400 and the lead film 600 are deviated toward the left side from the step formed on the second upper sealing surface 15 of the upper sealing part 310S. This can be similarly described with respect to the second lower sealing surface 25 of the lower sealing tool 20. Therefore, sufficient pressure may not be applied to the right end of the electrode lead 400 and the lead film 600 by the second upper sealing surface 15.

Referring to FIG. 4(b), the upper sealing part 310S and the lower sealing part 320S located adjacent to the right end of the electrode lead 400 and the lead film 600 may be formed with a first venting hole 310V and a second venting hole 320V. Here, the first venting hole 310V and the second venting hole 320V are generated because the inner resin layer of the upper sealing part 310S and the inner resin layer of the lower sealing part 320S are not sufficiently applied with pressure and heat to each other. The first venting hole 310V and the second venting hole 320V have problems that the sealing force of the battery cell 100 is reduced, and when the pressure in the battery cell 100 is increased, a venting phenomenon occurs at an early stage.

Accordingly, the battery cell manufacturing device according to the present embodiment is small in the pressure deviation for each position of the sealing parts 310S and 320S even when the positions of the electrode lead 400 and the lead venting current film 600 are deviated, and therefore, an attempt is made to manufacture a battery cell that prevents an early venting phenomenon while improving the sealing quality.

Hereinafter, a battery cell manufacturing device according to an embodiment of the present disclosure will be described.

FIGS. 5 to 8 are cross-sectional views of the sealing part of the battery cell of FIG. 1 formed by the battery cell manufacturing device according to an embodiment of the present disclosure, taken along the A-A' axis of FIG. 1.

Referring to FIGS. 5 to 8, the battery cell manufacturing device according to an embodiment of the present disclosure comprises sealing tools 1100 and 1200 that presses sealing parts 310S and 320S, in a battery case including the sealing parts 310S and 320S having a structure in which an electrode assembly 200 is mounted onto the receiving parts 310R and 320R, and an outer peripheral surface is sealed by heat fusion. Here, the sealing tools 1100 and 1200 include a first sealing tool 1100 located at an upper part and a second sealing tool 1200 located at a lower part with respect to the battery case 300.

More specifically, the sealing tools 1100 and 1200 include first sealing surfaces 1110 and 1210 and a pair of second sealing surfaces 1150 and 1250, respectively, wherein the first sealing surfaces 1100 and 1210 may be located between the pair of second sealing surfaces 1150 and 1250. Here, the first sealing surfaces 1110 and 1210 and the pair of second sealing surfaces 1150 and 1250 may be connected to each other. In one example, the first sealing surfaces 1110 and 1210 and the pair of second sealing surfaces 1150 and 1250 may be integrated with each other.

Further, in the sealing parts 310S and 320S, the first sealing surfaces 1110 and 1210 are opposed to the electrode lead 400, and the pair of second sealing surfaces 1150 and 1250 may be opposed to positions adjacent to both end parts of the electrode lead 400. Here, with the electrode lead 400 and the lead film 600 being interposed between the upper sealing part 310S and the lower sealing part 320S, the sealing tools 1100 and 1200 can be pressed and heated toward the upper sealing part 310S and the lower sealing part 320S. At this time, the sealing tools 1100 and 1200 form a step on the surface in contact with the second sealing surfaces 1150 and 1250 with respect to the surface in contact with the first sealing surfaces 1100 and 1210 in the sealing portions 310S and 320S.

Therefore, the battery cell manufacturing device according to the present embodiment can sufficiently seal the sealing parts 310S and 320S located adjacent to both end parts of the electrode lead 400 and the lead film 600, in addition to the sealing parts 310S and 320S located in the upper and lower end parts of the electrode lead 400 and the lead film 600.

Further, in the sealing tools 1100 and 1200, at least one pressure sensor may be located on the first sealing surfaces 1110 and 1210 and the pair of second sealing surfaces 1150 and 1250. More specifically, in the sealing tools 1100 and 1200, the pressure sensor includes a first pressure sensor and a second pressure sensor, wherein the first pressure sensor is located on the first sealing surfaces 1110 and 1210, and the second pressure sensor may be located on a pair of second sealing surfaces 1150 and 1250, respectively. However, the number or position of the pressure sensor is not limited to those described above, and can be applied even to the case of having various numbers and positions.

In one example, referring to FIGS. 5 to 8, the first pressure sensor may be arranged one by one at both sides with respect to the center of the first sealing surfaces 1110 and 2110, and the second pressure sensor may be located one by one at the center of the pair of second sealing surfaces 1150 and 2150, respectively.

Here, the first pressure sensor may acquire first pressure information applied toward the upper sealing part 310S from the first sealing surfaces 1110 and 1210, and the first pressure information may include pressure values for the first pressure P1 on the left side and the second pressure P2 on the right side with respect to the center of the first sealing surfaces 1110 and 1210. Further, the second pressure sensor may acquire second pressure information applied toward the upper sealing part 310S from the second sealing surfaces 1150 and 1250, and the second pressure information may include pressure values for the third pressure P3 and the fourth pressure P4 with respect to the center of the pair of second sealing surfaces 1110 and 2110. In the following, the description will be made by briefly representing by the first pressure information P1 and P2 and representing by the second pressure information P3 and P4.

In addition, even if the pressure values included in the first pressure information P1 and P2 acquired from the first pressure sensor and the pressure values included in the second pressure information P3 and P4 acquired from the second pressure sensor may be equal to each other, and even if the values are different, the difference may be relatively small.

More specifically, in the sealing tools 1100 and 1200, the difference between a pressure value included in a first pressure information P1 and P2 acquired from the first pressure sensor and a pressure value included in a second pressure information P3 and P4 acquired from the second pressure sensor may be 0 MPa or more and 0.4 MPa or less. Here, the pressure value may mean an average pressure value obtained while pressure is applied to the sealing parts 310S and 320S by the sealing tools 1100 and 1200.

Thereby, the pressure values included in the first pressure information P1 and P2 and the second pressure information P3 and P4 in the sealing tools 1100 and 1200 may have a difference in the pressure values in the above-described range, and the pressure deviation depending on the positions of the sealing parts 310S and 320S is relatively small, so that the sealing quality for each position may be excellent as a whole. Unlike the same, when the difference in the pressure values is 0.4 MPa or more, there is a problem that the sealing quality is deteriorated, such as venting holes 310V and 320V are generated in the sealing parts 310S and 320S depending on the position, as described above in FIGS. 3 and 4.

Here, the battery cell manufacturing device according to the present embodiment includes a separate control unit (not shown), and can control the degree to which the first sealing surfaces 1110 and 1200 and the pair of second sealing surfaces 1150 and 1250 apply pressure to the sealing parts 310S and 320S, respectively. Moreover, the control unit (not shown) may acquire first pressure information P1 and P2 and second pressure information P3 and P4 from the first pressure sensor and the second pressure sensor located on the first sealing surfaces 1110 and 1200 and the pair of second sealing surfaces 1150 and 1250.

The control unit (not shown) may include one or more selected among CPU (central processing unit), RAM (random access memory), GPU (graphic processing unit), one or more microprocessors, and electronic components capable of processing input data according to other predetermined logic. In one example, the control unit (not shown) can perform various processing, for example, the pressure deviation is determined based on the first pressure information P1 and P2 and the second pressure information P3 and P4 acquired from the first pressure sensor and the second pressure sensor, processes according to the determined information are developed on RAM, and according to the developed program, it controls the pressure applied to the sealing parts 310S and 320S by the first sealing surfaces 1110 and 1210 and the pair of second sealing surfaces 1150 and 1250, respectively.

Therefore, the battery cell manufacturing device according to the present embodiment can acquire pressure information applied to the sealing parts 310S and 320S from at least one pressure sensor that is located on the first sealing surfaces 1110 and 1210 and the pair of second sealing surfaces 1150 and 1250 of the sealing tools 1100 and 1200, thereby controlling the pressure according to the position of the sealing parts 310S and 320S. That is, the pressure deviation according to the positions of the sealing units 310S and 320S can be controlled so as to be reduced, thereby improving the sealing quality.

Referring to FIGS. 5 to 8, in the sealing tools 1100 and 1200, at least one of the first sealing tool 1100 and the second sealing tool 1200 may have a step formed on the pair of second sealing surfaces 1150 and 1250 with respect to the first sealing surfaces 1110 and 1210. More specifically, a step formed may be formed on the second sealing surfaces 1150 and 1250 in consideration of the thickness of the electrode lead 400 and the lead film 600. In one example, the step formed on the second sealing surfaces 1150 and 1250 may have a smaller step than the thickness of the electrode lead 400 and the lead film 600.

Therefore, with respect to the sealing parts 310S and 320S located adjacent to both ends of the electrode lead 400 and the lead film 600, due to the step formed on the second sealing surfaces 1150 and 1250, the surface contacting between the second sealing surfaces 1150 and 1250 and the sealing parts 310S and 320S is increased, and thus the sealing quality can be increased.

Figure 5:
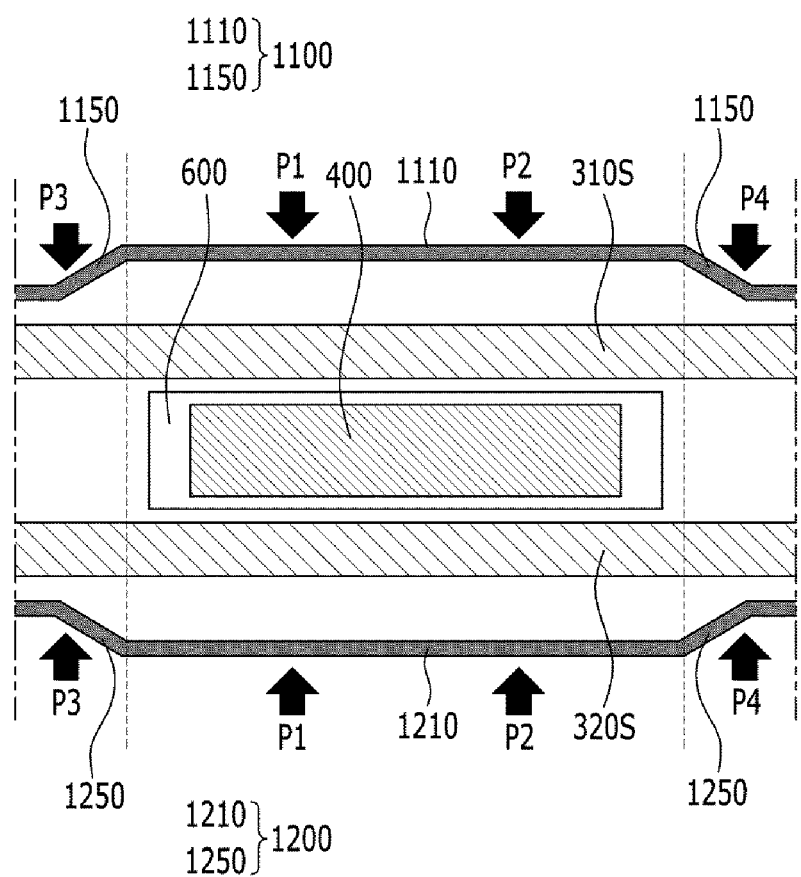
FIGS. 5 to 8 are cross-sectional views of the sealing part of the battery cell of FIG. 1 formed by the battery cell manufacturing device according to an embodiment of the present disclosure, taken along the A-A' axis of FIG. 1.
Figure 6:
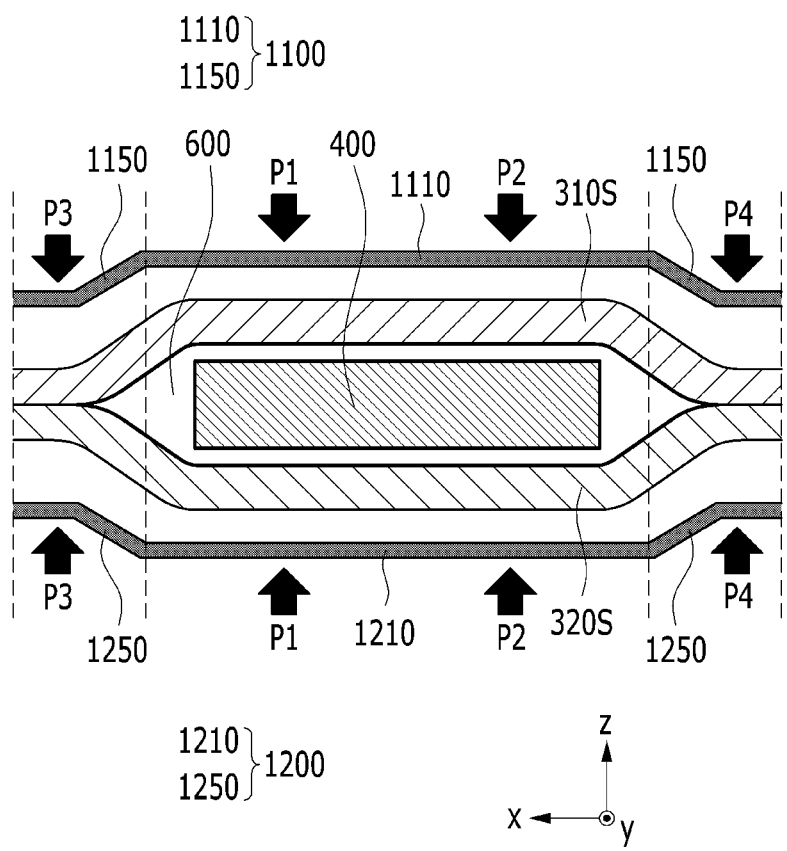

In one example, as shown in FIG. 5, between the first sealing tool 1100 and the lower sealing tool 1200, the positions of the electrode lead 400 and the lead film 600 located between the upper sealing part 310S and the lower sealing part 320S may conform to a designed position. Here, the first pressure information P1 and P2 acquired from the first pressure sensor and the second pressure information P3 and P4 acquired from the second pressure sensor include pressure values that are equal to each other or have a relatively small difference. As a result, referring to FIG. 6, the upper sealing part 310S and the lower sealing part 320S are pressed by the first sealing tool 1100 and the second sealing tool 1200 so as to have a relatively small pressure deviation for each position.

Figure 7:
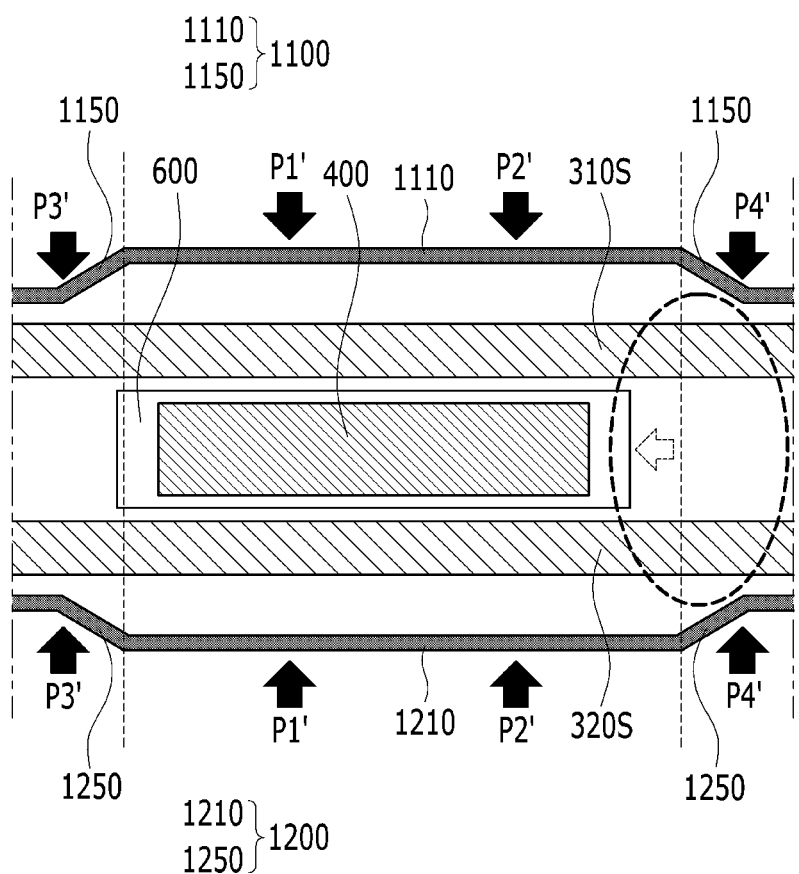

In another example, as shown in FIG. 7, between the first sealing tool 1100 and the lower sealing tool 1200, the positions of the electrode lead 400 and the lead film 600 located between the upper sealing part 310S and the lower sealing part 320S is deviated from a designed position, or a position having a relatively low sealing strength may be generated in the sealing parts 310S and 320S. Here, the first pressure information P1' and P2' acquired from the first pressure sensor and the second pressure information P3' and P4' acquired from the second pressure sensor may include pressure values that are different from each other, but have relatively large difference.

More specifically, as shown in FIG. 7, when the right end parts of the electrode lead 400 and the lead film 600 are deviated toward the left side from the step formed on the second upper sealing surface 15 of the upper sealing part 310S, in the second pressure information P3' and P4', the third pressure P3' becomes relatively large and the fourth pressure P4' decreases. In addition, in the first pressure information P1' and P2', the first pressure P1' becomes relatively large and the second pressure P2' decreases. In this manner, the pressure may not be sufficiently applied to the right end part of the electrode lead 400 and the lead film 600 by the second upper sealing surface 1150.

Here, considering the first pressure information P1' and P2' acquired from the first pressure sensor and the second pressure information P3' and P4' acquired from the second pressure sensor, the sealing tools 1100 and 1200 adjust so that a relatively higher pressure is applied to the parts P2' and P4' to which a relatively small pressure is applied as described above, and adjusts so that a relatively lower pressure is applied to the parts P1' and P3' to which a relatively large pressure is applied. That is, the pressures of the sealing parts 310S and 320S for each position can be adjusted so as to reach a constant pressure, respectively.

Figure 8:
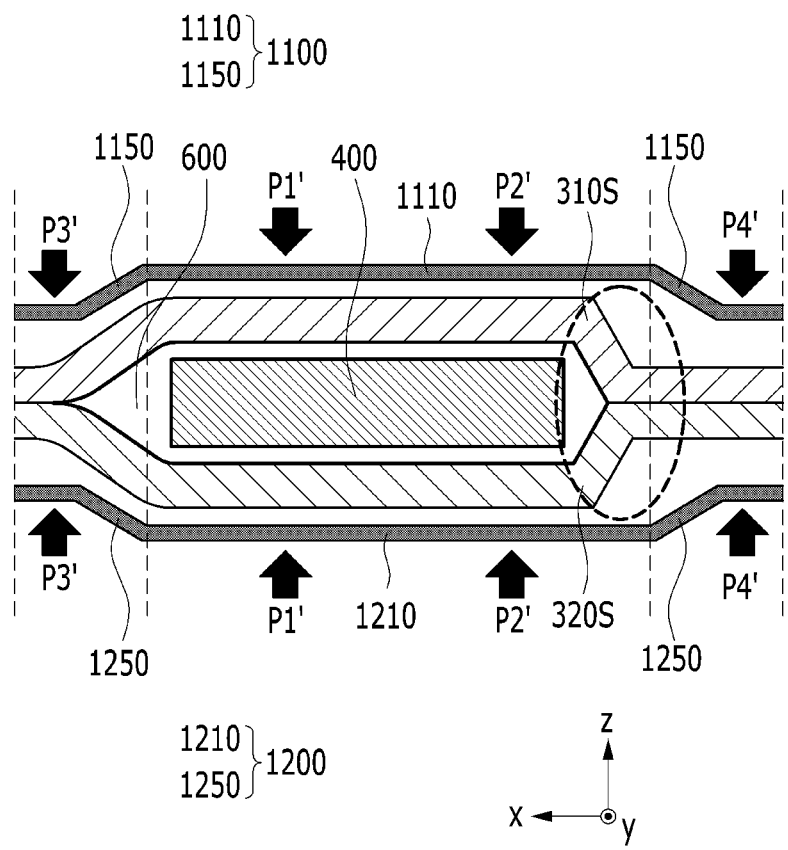

Therefore, referring to FIG. 8, even in various problem situations, such as the position of the electrode lead 400 and the lead film 600 deviating from the designed position, the pressure for each position of the upper sealing part 310S and the lower sealing part 320S of the sealing tools 1100 and 1200 is adjusted, and thus the pressure deviation for each position of the upper sealing part 310S and the lower sealing part 320S can be reduced. Further, it is possible to prevent the venting holes 310V and 320V from being generated as shown in FIG. 4b. It is not necessary to separately change the positions and shapes of the sealing tools 1100 and 1200 according to the positions or shapes of the electrode leads 400 and the lead film 600, which is advantageous in that the time and cost of the manufacturing process can be shortened.

FIGS. 9 to 12 are cross-sectional views of the sealing part of the battery cell of FIGS. 1 and 2 formed by the battery cell manufacturing device according to another embodiment of the present disclosure, taken along the A-A' axis of FIG. 2.

Here, the sealing tools 2100 and 2200 according to the present embodiment can be described in almost the same manner as the above-mentioned sealing tools 1100 and 1200. Hereinafter, only portions different from the above-mentioned sealing tools 1100 and 1200 will be mainly described.

Referring to FIGS. 9 to 12, the sealing tools 2100 and 2200 include first sealing surfaces 2110 and 2210 and a pair of second sealing surfaces 2150 and 2250, respectively, wherein the first sealing surfaces 2100 and 2210 may be located between the pair of second sealing surfaces 2150 and 2250. In particular, the first sealing tool 2100 and the second sealing tool 2200 may be configured such that the first sealing surfaces 2110 and 2210 and the pair of second sealing surfaces 2150 and 2250 have a flat structure. More specifically, the first sealing surfaces 2110 and 2210 and the pair of second sealing surfaces 2150 and 2250 may be integrated with each other.

Figure 9:
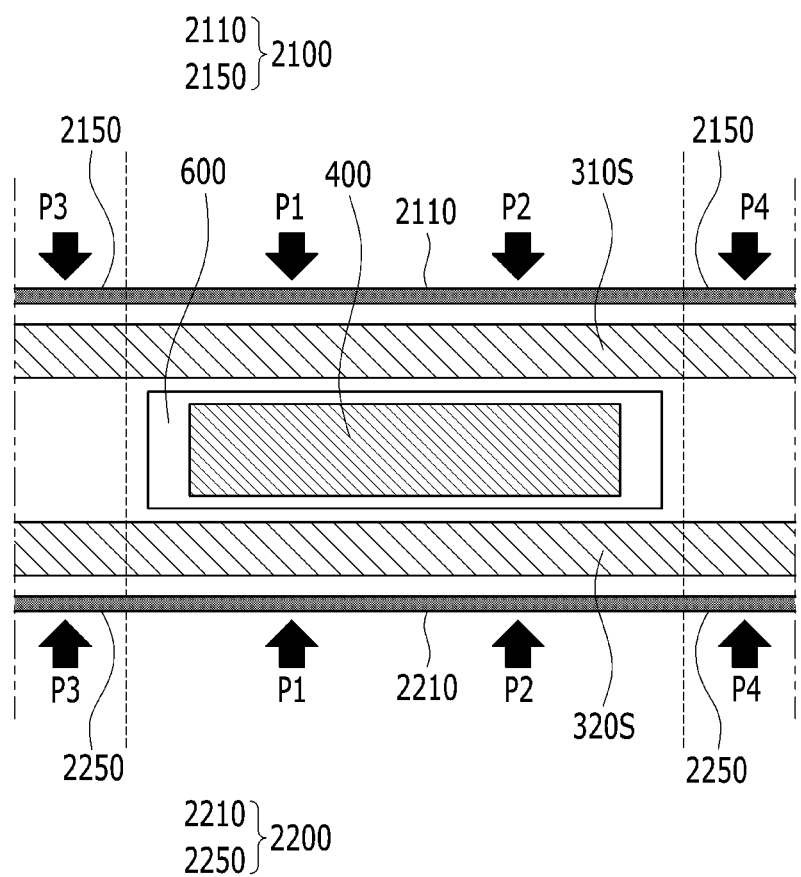
FIGS. 9 to 12 are cross-sectional views of the sealing part of the battery cell of FIG. 1 formed by the battery cell manufacturing device according to another embodiment of the present disclosure, taken along the A-A' axis of FIG. 1.
Figure 10:
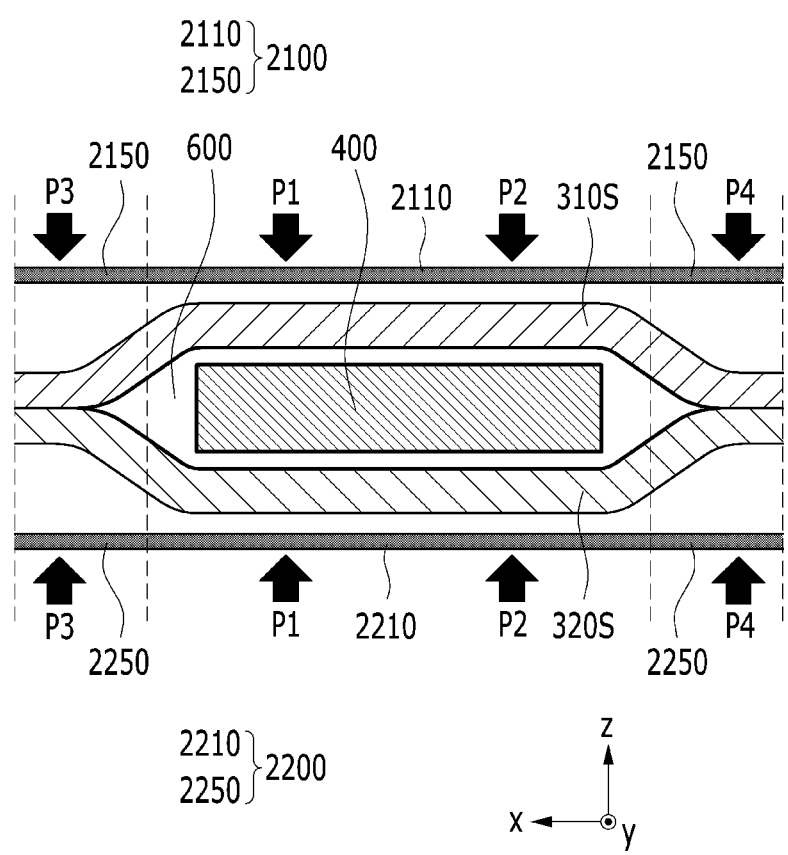

In one example, as shown in FIG. 9, between the first sealing tool 2100 and the lower sealing tool 2200, the positions of the electrode lead 400 and the lead film 600 located between the upper sealing part 310S and the lower sealing part 320S may conform to a designed position. Here, the first pressure information P1 and P2 acquired from the first pressure sensor and the second pressure information P3 and P4 acquired from the second pressure sensor include pressure values that are equal to each other or have a relatively small difference. Therefore, referring to FIG. 6, the upper sealing part 310S and the lower sealing part 320S are pressed and sealed by the first sealing tool 1100 and the second sealing tool 1200 so as to have a relatively small pressure deviation for each position.

Figure 11:
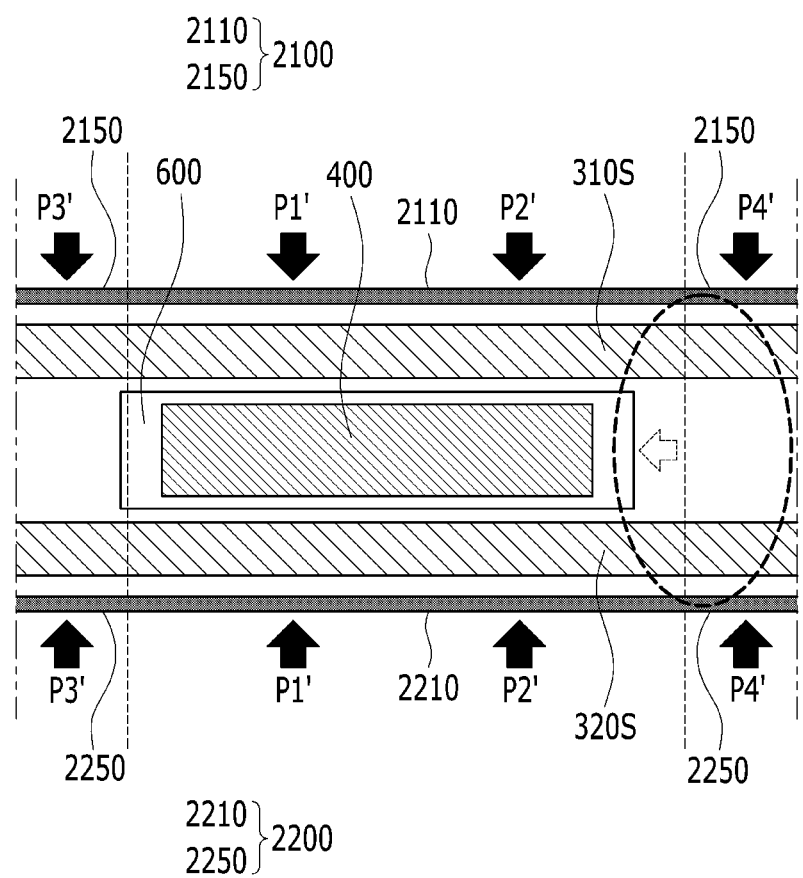

Further, in another example, as shown in FIG. 11, between the first sealing tool 2100 and the lower sealing tool 2200, the positions of the electrode lead 400 and the lead film 600 located between the upper sealing part 310S and the lower sealing part 320S may be deviated from a designed position, and a position having a relatively low sealing strength may be generated in the sealing parts 310S and 320S. Therefore, as shown in FIG. 12a, venting holes 310V and 320V may be formed in a part of the sealing parts 310S and 320S. Here, while the first pressure information P1' and P2' acquired from the first pressure sensor and the second pressure information P3' and P4' acquired from the second pressure sensor may include pressure values that are different from each other but have a relatively large difference.

Figure 12:
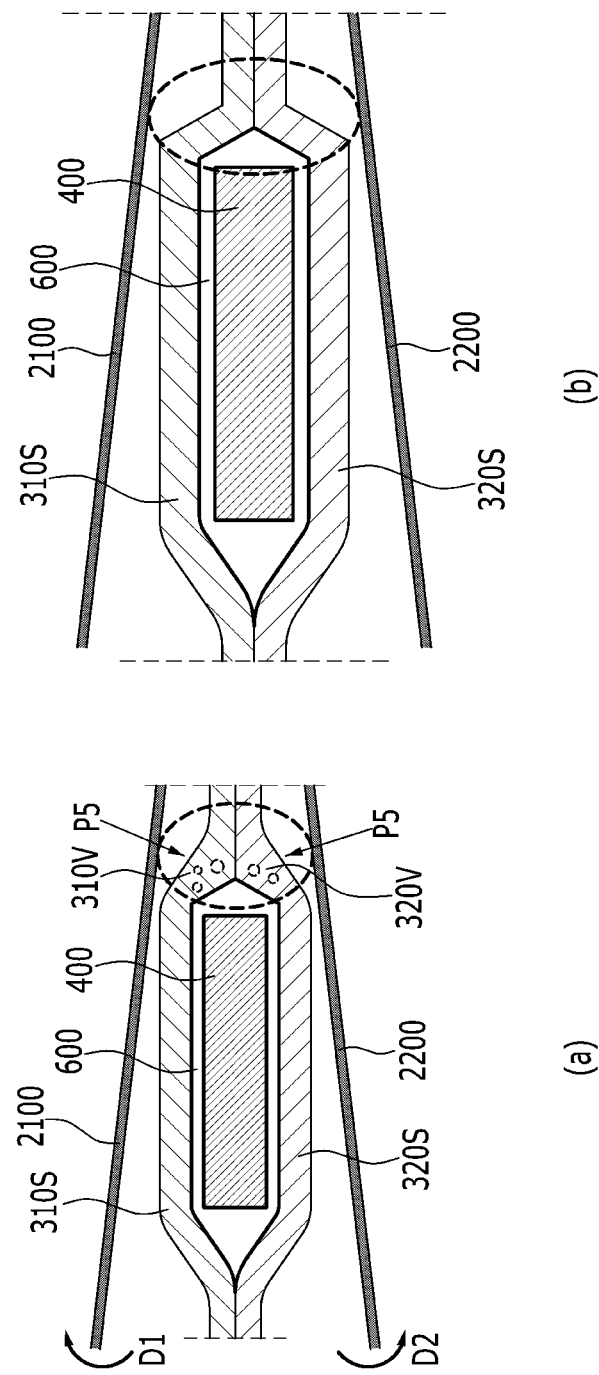

Here, as shown in FIG. 12, in the sealing tools 2100 and 2200, at least one of the first sealing tool 2100 and the second sealing tool 2200 may be inclined adjacent to at least one surface of the sealing parts 310S and 320S. In particular, in a state in which at least one of the first sealing tool 2100 and the second sealing tool 2200 is inclined adjacently, pressure may be applied to a surface having a relatively low pressure value among the sealing parts 310S and 320S, on the basis of the first pressure information P1' and P2' and the second pressure information P3' and P4'. In one example, referring to FIG. 12(a), in a state where the first sealing tool 2100 and the second sealing tool 2200 are adjacently inclined, a fifth pressure P5 may be applied to a surface having a relatively low pressure value.

Here, the fifth pressure P5 can acquire the pressure value via the first pressure sensor or the second pressure sensor. Further, considering the first pressure information P1' and P2' and the second pressure information P3' and P4' acquired from the second pressure sensor, the fifth pressure P5 may be a value adjusted to apply a relatively higher pressure to a portion to which a relatively small pressure is applied as described above.

Accordingly, unlike FIGS. 5 to 8, although a step is not formed on the second sealing surfaces 2150 and 2250 of the sealing tools 2100 and 2200 according to the present embodiment, the sealing tools 2100 and 2200 are inclined so as to be adjacent to a portion having a relatively small pressure value on the sealing parts 310S and 320S as shown in FIG. 12(*a*), and even a portion where the sealing strength is weakened can be reinforced so as to reach a constant pressure as shown in FIG. 12(*b*), and thus, the sealing quality can be improved.

The battery cell according to another embodiment of the present disclosure may be a battery cell manufactured by the above-mentioned battery cell manufacturing device. Further, the battery module according to another embodiment of the present disclosure includes a battery cell manufactured by the above-mentioned battery cell manufacturing device. Meanwhile, one or more battery modules according to the present embodiment may be packaged in a pack case to form a battery pack.

The above-mentioned battery module and battery pack can be applied to various devices. Such a device may be applied to a vehicle means such as an electric bicycle, an electric vehicle, or a hybrid vehicle, but the present disclosure is not limited thereto, and is applicable to various devices that can use a battery module, which also belongs to the scope of the present disclosure.

Although preferred embodiments of the present disclosure have been shown and described above, the scope of the present disclosure is not limited thereto, and numerous other variations and modifications made by those skilled in the art using the basic principles of the invention defined in the appended claims also fall within the spirit and scope of the invention.

DESCRIPTION OF REFERENCE NUMERALS

100: battery cell
200: electrode assembly
300: battery case
310R, 320R: receiving part
310S, 320S: sealing part
400: electrode lead
600: lead film
1100, 2100: upper sealing tool
1200, 2200: lower sealing tool

The invention claimed is:

1. A battery cell manufacturing device comprising:
   a sealing tool configured to press a sealing part of a battery case, the battery case including an electrode assembly mounted within a receiving part thereof, the sealing part being an outer peripheral surface of the battery case that is configured to be sealed by heat fusion,
   wherein the sealing tool comprises a first sealing tool and a second sealing tool, the sealing tool being configured to receive the battery case therein with the first sealing tool located above an upper part of the battery case and the second sealing tool located below a lower part of the battery case,
   wherein the sealing tool comprises a sealing surface configured to contact the sealing part of the battery case, the sealing surface comprising a first sealing surface and a pair of second sealing surfaces, the first sealing surface located between the pair of second sealing surfaces, and the sealing tool has a first pressure sensor and a pair of second pressure sensors, the first pressure sensor located on the first sealing surface, the pair of second pressure sensors located respectively on the pair of second sealing surfaces,
   wherein the battery cell manufacturing device is configured to measure a difference between a first pressure value measured by a left one of the second pressure sensors and a second pressure value measured by a right one of the second pressure sensors, and
   wherein the battery cell manufacturing device is configured to increase a pressure applied to a left one or a right one of the second sealing surfaces to increase one of the first pressure value or the second pressure value that is lower.

2. The battery cell manufacturing device according to claim 1, wherein the sealing tool is configured to press a portion of the sealing part of the battery case through which an electrode lead part protrudes through the sealing part to an outside of the battery case, and the electrode lead part comprises an electrode lead and a lead film attached to at least one surface of the electrode lead.

3. The battery cell manufacturing device according to claim 2, wherein the first sealing surface is configured to face a center of the electrode lead, and the pair of second sealing surfaces are configured to have positions adjacent to respective opposite ends of the electrode lead.

4. The battery cell manufacturing device according to claim 3, wherein the sealing tool has a pair of steps on the sealing surface extending between the first sealing surface and the pair of second sealing surfaces, respectively.

5. The battery cell manufacturing device according to claim 4, wherein at least one of the first sealing tool and the second sealing tool has the pair of steps.

6. The battery cell manufacturing device according to claim 5, wherein the at least one pressure sensor is configured to detect when a pressure value included in a first pressure information measured by the first pressure sensor and a pressure value included in a second pressure information measured by the second pressure sensor are equal to each other.

* * * * *